(12) United States Patent
Sano

(10) Patent No.: US 10,326,903 B2
(45) Date of Patent: Jun. 18, 2019

(54) IMAGE READER DEVICE, AND SEMICONDUCTOR DEVICE

(71) Applicant: SEIKO EPSON CORPORATION, Tokyo (JP)

(72) Inventor: Takafumi Sano, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 88 days.

(21) Appl. No.: 15/714,471

(22) Filed: Sep. 25, 2017

(65) Prior Publication Data

US 2018/0091692 A1 Mar. 29, 2018

(30) Foreign Application Priority Data

Sep. 29, 2016 (JP) ................................. 2016-191497

(51) Int. Cl.
*H04N 1/193* (2006.01)
*H04N 1/40* (2006.01)
*H04N 5/369* (2011.01)
*H04N 5/378* (2011.01)

(52) U.S. Cl.
CPC ....... *H04N 1/1931* (2013.01); *H04N 1/40056* (2013.01); *H04N 1/40068* (2013.01); *H04N 5/3692* (2013.01); *H04N 5/3694* (2013.01); *H04N 5/378* (2013.01); *H04N 2201/0081* (2013.01)

(58) Field of Classification Search
CPC ......................... H04N 1/1931; H04N 1/40056
See application file for complete search history.

(56) References Cited

U.S. PATENT DOCUMENTS

| | | | |
|---|---|---|---|
| 5,146,339 A | 8/1992 | Shinohara et al. | |
| 2002/0070331 A1* | 6/2002 | Inui | H04N 1/40056 250/208.1 |
| 2008/0297390 A1* | 12/2008 | Ko | G09G 3/3685 341/144 |
| 2011/0049333 A1* | 3/2011 | Yamashita | H01L 27/14603 250/208.1 |
| 2013/0083227 A1* | 4/2013 | Murata | H04N 5/3532 348/308 |

FOREIGN PATENT DOCUMENTS

| | | |
|---|---|---|
| JP | H04-177984 A | 6/1992 |
| JP | 2016-163319 A | 9/2016 |
| JP | 2016-163320 A | 9/2016 |

* cited by examiner

*Primary Examiner* — Ibrahim Siddo
(74) *Attorney, Agent, or Firm* — Oliff PLC

(57) ABSTRACT

Each of a plurality of image reader chips included in an image reader device includes: a readout circuit that reads out a pixel signal output from a pixel portion; a transfer interconnect; an output circuit that outputs the pixel signal; a capacitor that is selectively connected between the transfer interconnect and the output circuit; and a constant voltage circuit. The constant voltage circuit is selectively connected to a first terminal of the capacitor via the output circuit.

13 Claims, 8 Drawing Sheets

IMAGE READER DEVICE, AND SEMICONDUCTOR DEVICE

BACKGROUND

1. Technical Field

The present invention relates to an image reader device, and a semiconductor device.

2. Related Art

Image reader devices (scanners) that use contact image sensors, and copy machines and multifunctional printers that have a print function in addition to a scan function have been developed. As a contact image sensor used in an image reader device, a contact image sensor having a configuration that uses a photodiode provided on a semiconductor substrate is used. In general, an image reader device such as a scanner includes a plurality of sensor chips (image reader chips) including a large number of pixel portions that are arranged in one direction, each pixel portion including one or a plurality of photodiodes.

For example, JP-A-4-177984 discloses: a photoelectric conversion device including a photoelectric device, a storage capacitive element that accumulates electric charges generated in the photoelectric device, a buffer circuit for sequentially outputting the electric charges stored in the storage capacitive element, and an output amplifier that outputs a signal from the buffer circuit; and a multiple chip image sensor device in which a plurality of such photoelectric conversion devices are connected. The photoelectric conversion device can be applied to an image reader chip, and the multiple chip image sensor device can be applied to an image sensor module included in an image reader device.

However, the multiple chip image sensor device (image sensor module) is problematic in that a defect may occur in a read image, particularly in boundaries between a plurality of image reader chips, due to variations in characteristics between the photoelectric conversion devices (image reader chips), and thus there is room for improvement.

SUMMARY

The invention has been made in view of the problems described above. According to an advantage of some aspects of the invention, it is possible to provide an image reader device including an image sensor module in which a plurality of image reader chips are arranged, wherein an characteristics offset between the image reader chips can be corrected to improve the quality of read image. Also, according to an advantage of some aspects of the invention, it is possible to provide a semiconductor device that can correct such an offset.

The invention has been made in order to solve at least some of the problems described above, and can be implemented as aspects or application examples described below.

APPLICATION EXAMPLE 1

An image reader device according to the present application example is an image reader device including a plurality of image reader chips for reading an image, wherein each of the plurality of image reader chips includes: a pixel portion that outputs a pixel signal, the pixel portion including a light receiving element that receives light from the image and performs photoelectric conversion; a readout circuit portion that reads out the pixel signal output from the pixel portion; a transfer interconnect that transfers the pixel signal read out by the readout circuit portion; an output circuit that outputs the pixel signal; a capacitor having a first terminal that is selectively connected to the transfer interconnect and a second terminal that is selectively connected to the output circuit; and a constant voltage output portion that outputs a constant voltage signal, and the constant voltage output portion is selectively connected to the first terminal of the capacitor via the output circuit.

With the image reader device according to the present application example, when the first terminal of the capacitor is connected to the constant voltage output portion via the output circuit, it is possible to store electric charges containing an offset component according to the constant voltage signal output from the constant voltage output portion. Also, when the first terminal of the capacitor is connected to the transfer interconnect and the second terminal of the capacitor is connected to the output circuit, it is possible to correct the offset component by using the electric charges containing the offset component stored in the capacitor. Accordingly, with the image reader device according to the present application example, variations between the plurality of image reader chips can be suppressed, and a defect in the read image in the boundary between the plurality of image reader chips can be prevented.

APPLICATION EXAMPLE 2

In the image reader device according to the application example described above, when the pixel signal is transferred to the transfer interconnect, the first terminal of the capacitor may be connected to the transfer interconnect, and the second terminal of the capacitor may be connected to the output circuit.

With the image reader device according to the present application example, when the pixel signal is transferred to the transfer interconnect, the first terminal of the capacitor in which electric charges are stored is connected to the transfer interconnect, and the second terminal of the capacitor is connected to the output circuit. Accordingly, with the image reader device according to the present application example, offset component correction can be performed on a plurality of pixel signals.

APPLICATION EXAMPLE 3

An image reader device according to the present application example is an image reader device including a plurality of image reader chips for reading an image, wherein each of the plurality of image reader chips includes: a pixel portion that outputs a pixel signal, the pixel portion including a light receiving element that receives light from the image and performs photoelectric conversion; a readout circuit portion that reads out the pixel signal output from the pixel portion; a transfer interconnect that transfers the pixel signal read out by the readout circuit portion; an output circuit that outputs the pixel signal; an operational amplifier having a first input terminal that is connected to the transfer interconnect and an output terminal that is connected to the output circuit; a capacitor having a first terminal that is selectively connected to a second input terminal of the operational amplifier and a second terminal that is selectively connected to the output circuit; and a constant voltage output portion that outputs a constant voltage signal, and the constant voltage output portion is selectively connected to the first terminal of the capacitor via the output circuit.

With the image reader device according to the present application example, when the first terminal of the capacitor is connected to the constant voltage output portion via the output circuit, it is possible to store electric charges containing an offset component according to the constant voltage signal output from the constant voltage output portion. Also, when the first terminal of the capacitor is electrically connected to the transfer interconnect via the operational amplifier (virtual short), and the second terminal of the capacitor is connected to the output circuit, it is possible to correct the offset component by using the electric charges containing the offset component stored in the capacitor. Accordingly, with the image reader device according to the present application example, variations between the plurality of image reader chips can be suppressed, and a defect in the read image in the boundary between the plurality of image reader chips can be prevented.

Furthermore, with the image reader device according to the present application example, the operational amplifier is provided in the transfer interconnect that transfers the image signal, and impedance conversion is performed by the operational amplifier, and thus an influence of variations in the impedance characteristics of the output circuit is not received. Accordingly, with the image reader device according to the present application example, it is possible to further suppress variations between the plurality of image reader chips, and more reliably prevent a defect in the read image in the boundary between the plurality of image reader chips.

APPLICATION EXAMPLE 4

In the image reader device according to the application example described above, when the pixel signal is transferred to the transfer interconnect, the first terminal of the capacitor may be connected to the second input terminal of the operational amplifier, and the second terminal of the capacitor may be connected to the output circuit.

With the image reader device according to the present application example, when the pixel signal is transferred to the transfer interconnect, the first terminal of the capacitor in which electric charges are stored is connected to the transfer interconnect via the operational amplifier (virtual short), and the second terminal of the capacitor is connected to the output circuit. Accordingly, with the image reader device according to the present application example, offset component correction can be performed on a plurality of pixel signals.

APPLICATION EXAMPLE 5

In the image reader device according to the application example described above, the constant voltage output portion may be connected to the first terminal of the capacitor via the output circuit before the pixel signal is transferred to the transfer interconnect.

With the image reader device according to the present application example, the constant voltage output portion is connected to the first terminal of the capacitor via the output circuit so as to store electric charges before the pixel signal is transferred to the transfer interconnect. Accordingly, with the image reader device according to the present application example, the electric charges stored in the capacitor are induced by the voltage supplied from the constant voltage output portion via the output circuit, without contributing to the pixel signal. Accordingly, the accuracy of correction can be improved.

APPLICATION EXAMPLE 6

In the image reader device according to the application example described above, the voltage signal output by the constant voltage output portion may be generated based on a first reference voltage, and the first reference voltage may be a voltage that is common to the plurality of image reader chips.

With the image reader device according to the present application example, the voltage output by the constant voltage output portion is generated based on the first reference voltage that is common to the plurality of image reader chips. That is, the electric charges stored in the capacitor of each of the plurality of image reader chips are stored based on the voltage signal common to the plurality of image reader chips. Accordingly, with the image reader device according to the present application example, it is possible to further suppress correction variations between the plurality of image reader chips, and prevent a defect in the read image in the boundary between the plurality of image reader chips.

APPLICATION EXAMPLE 7

In the image reader device according to the application example described above, the second terminal of the capacitor may be selectively connected to a second reference voltage before the pixel signal is transferred to the transfer interconnect.

With the image reader device according to the present application example, the second terminal of the capacitor is connected to the second reference voltage before the pixel signal is transferred to the transfer interconnect. Thus, the electric charges stored in the capacitor are determined based on the constant voltage signal output from the constant voltage output portion and the second reference voltage. Accordingly, with the image reader device according to the present application example, the accuracy of electric charges containing an offset component stored in the capacitor is improved, and thus the accuracy of correction can be further increased.

APPLICATION EXAMPLE 8

In the image reader device according to the application example described above, the second reference voltage may be a voltage that is common to the plurality of image reader chips.

With the image reader device according to the present application example, the second terminal of the capacitor is connected to the second reference voltage that is common to the plurality of image reader chips before the pixel signal is transferred to the transfer interconnect. Thus, the electric charges stored in the capacitor of each of the plurality of image reader chips are determined based on the constant voltage signal output from the constant voltage output portion and the second reference voltage that is common to the plurality of image reader chips. Accordingly, with the image reader device according to the present application example, it is possible to further suppress correction variations between the plurality of image reader chips, and prevent a defect in the read image in the boundary between the plurality of image reader chips.

APPLICATION EXAMPLE 9

In the image reader device according to the application example described above, the first reference voltage and the second reference voltage may be the same voltage.

With the image reader device according to the present application example, the first reference voltage and the second reference voltage are the same voltage. Accordingly, the potential difference between both end voltages applied to the capacitor is small, and the amount of electric charges required to correct variations between the plurality of image reader chips can be reduced.

APPLICATION EXAMPLE 10

In the image reader device according to the application example described above, the output circuit may be a source follower circuit.

With the image reader device according to the present application example, by configuring the output circuit by using a source follower circuit, the circuit can be simplified, the mounting area can be reduced, and miniaturization of image reader chip can be implemented.

APPLICATION EXAMPLE 11

In the image reader device according to the application example described above, the readout circuit portion and the constant voltage output portion may be source follower circuits.

With the image reader device according to the present application example, by configuring the readout circuit portion and the constant voltage output portion by using source follower circuits, the influence of impedance of the transfer interconnect can be reduced, and degradation in the quality of read images can be suppressed.

Furthermore, with the image reader device according to the present application example, by configuring both the readout circuit portion and the constant voltage output portion by using source follower circuits of the same configuration, it is possible to further suppress correction variations in the readout circuit portion and the constant voltage output portion between the plurality of image reader chips, and prevent a defect in the read image in the boundary between the plurality of image reader chips.

APPLICATION EXAMPLE 12

In the image reader device according to the application example described above, the source follower circuit may include a depletion type field-effect transistor.

With the image reader device according to the present application example, by configuring the source follower circuit by using a depletion type field-effect transistor, a voltage drop caused by each threshold voltage is reduced. Accordingly, it is possible to expand the dynamic range of the output of the source follower circuit. This configuration is also effective in improving the quality of read image.

APPLICATION EXAMPLE 13

A semiconductor device according to the present application example includes; a pixel portion that outputs a pixel signal, the pixel portion including a light receiving element that receives light and performs photoelectric conversion; a readout circuit portion that reads out the pixel signal output from the pixel portion; a transfer interconnect that transfers the pixel signal read out by the readout circuit portion; an output circuit that outputs the pixel signal; a capacitor having a first terminal that is selectively connected to the transfer interconnect and a second terminal that is selectively connected to the output circuit; and a constant voltage output portion that outputs a constant voltage signal, and the constant voltage output portion is selectively connected to the first terminal of the capacitor via the output circuit.

With the semiconductor device according to the present application example, when the first terminal of the capacitor is connected to the constant voltage output portion via the output circuit, it is possible to store electric charges containing an offset component according to the constant voltage signal output from the constant voltage output portion. Also, when the first terminal of the capacitor is connected to the transfer interconnect and the second terminal of the capacitor is connected to the output circuit, a signal corrected by the electric charges containing an offset component stored in the capacitor is output via the output circuit. Accordingly, with the semiconductor device according to the present application example, it is possible to output a signal in which the offset component included in the semiconductor device has been corrected.

APPLICATION EXAMPLE 14

A semiconductor device according to the present application example includes: a pixel portion that outputs a pixel signal, the pixel portion including a light receiving element that receives light and performs photoelectric conversion; a readout circuit portion that reads out the pixel signal output from the pixel portion; a transfer interconnect that transfers the pixel signal read out by the readout circuit portion; an output circuit that outputs the pixel signal; an operational amplifier having a first input terminal that is connected to the transfer interconnect and an output terminal that is connected to the output circuit; a capacitor having a first terminal that is selectively connected to a second input terminal of the operational amplifier and a second terminal that is selectively connected to the output circuit; and a constant voltage output portion that outputs a constant voltage signal, and the constant voltage output portion is selectively connected to the first terminal of the capacitor via the output circuit.

With the semiconductor device according to the present application example, when the first terminal of the capacitor is connected to the constant voltage output portion via the output circuit, it is possible to store electric charges containing an offset component according to the constant voltage signal output from the constant voltage output portion. Also, when the first terminal of the capacitor is connected to the transfer interconnect via the operational amplifier (virtual short), and the second terminal of the capacitor is connected to the output circuit, a signal corrected by the electric charges containing an offset component stored in the capacitor is output via the output circuit. Accordingly, with the semiconductor device according to the present application example, it is possible to output a signal in which the offset component included in the semiconductor device has been corrected.

Furthermore, with the image reader device according to the present application example, the operational amplifier is provided in the transfer interconnect that transfers the image signal, and impedance conversion is performed by the operational amplifier, and thus the offset component can be corrected without receiving any influence of variations in the impedance characteristics of the output circuit.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, preferred embodiments of the invention will be described in detail with reference to the drawings. The drawings used are provided to facilitate the understanding of the description. Note that the embodiments given below are not intended to unduly limit the scope of the invention recited in the appended claims. In addition, not all of the constituent elements described below are essential to the invention, A description will be given below of a multifunction peripheral 1 (multifunction peripheral apparatus), to which an image reader device according to the invention is applied, with reference to the accompanying drawings.

1, First Embodiment 1.1 Structure of Multifunction Peripheral (Multifunction Peripheral Apparatus)

Figure 1:
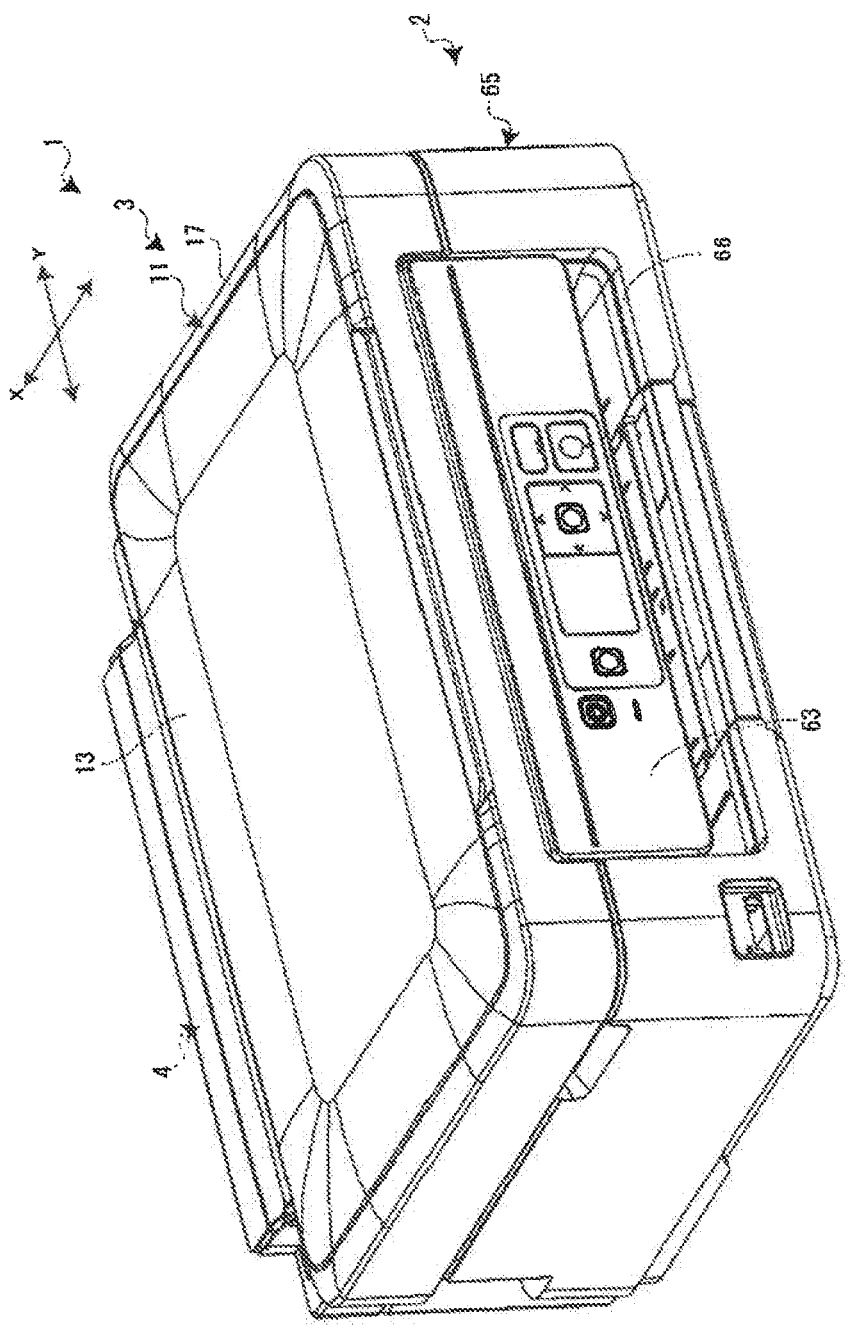
FIG. 1 is an external perspective view of a multifunction peripheral according to an embodiment of the invention.

FIG. 1 is an external perspective view of a multifunction peripheral 1 according to a first embodiment. As shown in FIG. 1, the multifunction peripheral 1 integrally includes a printer unit 2 (image recording device) that is a device main body, and a scanner unit 3 (image reader device) that is an upper unit provided on top of the printer unit 2. The following wing description will be given assuming that in FIG. 1, the front rear direction is defined as "X axis direction" and the right left direction is defined as "Y axis direction".

On the other hand, as shown in FIG. 1, the printer unit 2 includes: a conveyance portion (not shown) that conveys a sheet of recording medium (print paper or cut sheets) along a feed path; a printing portion (not shown) that is provided above the feed path, and performs inkjet print processing on the recording medium; a panel operation portion 63 provided on a front surface; a device frame (not shown) incorporating the conveyance portion, the printing portion, and the operation portion 63; and a device housing 65 that covers the aforementioned constituent elements. The device housing 65 is provided with a discharge outlet 66 through which the printed recording medium is discharged. Although not shown in the diagram, a USB port and a power port are provided in a lower portion of a rear surface. That is, the multifunction peripheral 1 is configured to be connectable to a computer and the like via the USB port.

The scanner unit 3 is pivotably supported by the printer unit 2 via a hinge portion 4 provided at a rear end, and covers a top portion of the printer unit 2 so as to be capable of opening and closing. That is, by raising the scanner unit 3 in the pivotal direction, an upper surface opening portion of the printer unit 2 is exposed so as to expose the inside of the printer unit 2 via the upper surface opening portion. On the other hand, by lowering the scanner unit 3 in the pivotal direction to place it on the printer unit 2, the upper surface opening portion is closed by the scanner unit 3. The configuration in which the scanner unit 3 can be opened in the manner as described above allows ink cartridge exchange, the clearance of paper jams, and the like to be performed.

Figure 2:
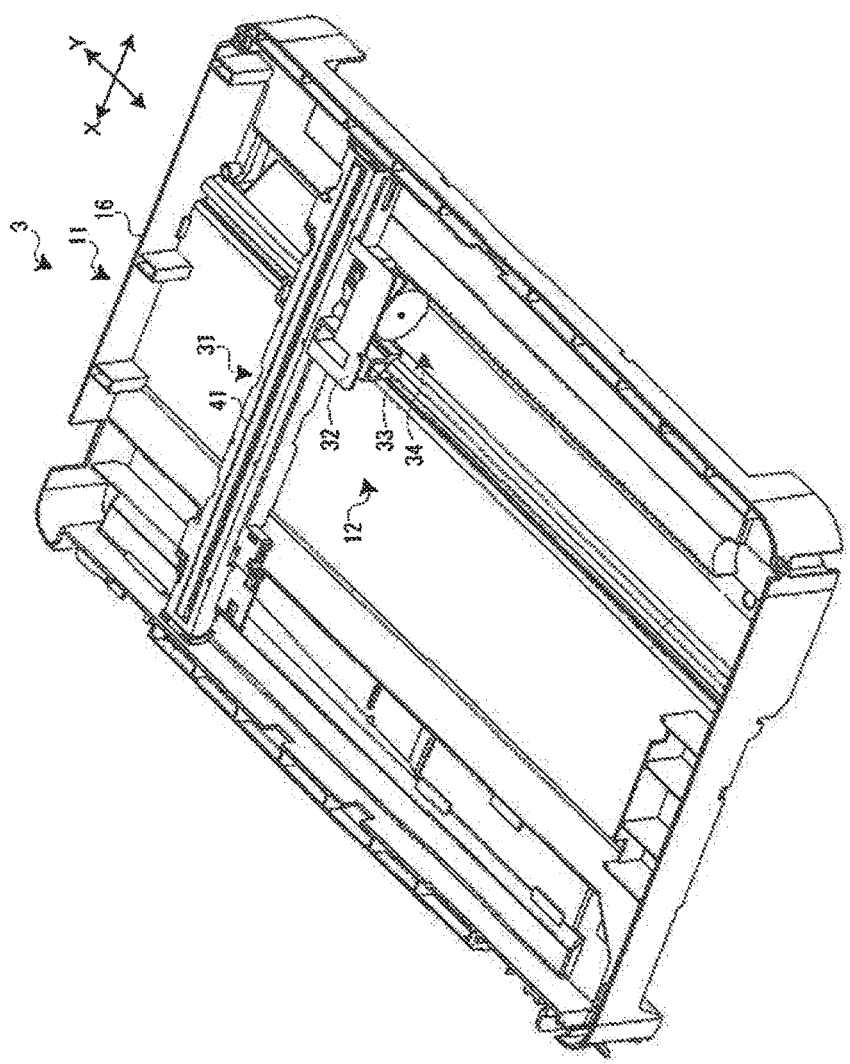
FIG. 2 is a perspective view of an internal structure of a scanner unit.

FIG. 2 is a perspective view of an internal structure of the scanner unit 3. As shown in FIGS. 1 and 2, the scanner unit 3 includes an upper frame 11 that is a casing, an image reader portion 12 housed in the upper frame 11, and an upper cover 13 that is pivotably supported on top of the upper frame 11. As shown in FIG. 2, the upper frame 11 includes a box-shaped lower case 16 that houses the image reader portion 12 and an upper case 17 that covers the top side of the lower case 16. An original placing plate (platen, not shown) made of glass is provided over the upper case 17, and an medium to be read (original) is placed on the original placing plate with the side to be read facing downward. On the other hand, the lower case 16 is formed to have a shallow box shape with its upper side being open.

As shown in FIG. 2, the image reader portion 12 includes a line sensor type sensor unit 31, a sensor carriage 32 incorporating the sensor unit 31, a guide shaft 33 that extends in the Y axis direction and slidably supports the sensor carriage 32, and a self-propelled sensor moving mechanism 34 that moves the sensor carriage 32 along the guide shaft 33. The sensor unit 31 includes an image sensor module 41 that is a CMOS (complementary metal-oxide-semiconductor) line sensor extending in the X axis direction, and is reciprocally moved along the guide shaft 33 in the Y axis direction by the motor-driven sensor moving mechanism 34. With the reciprocal movement, the image on the medium to be read (original) placed on the original placing plate is read. The image sensor module 41 incorporated in the sensor unit 31 may be a CCD (charge coupled device) line sensor.

Figure 3:
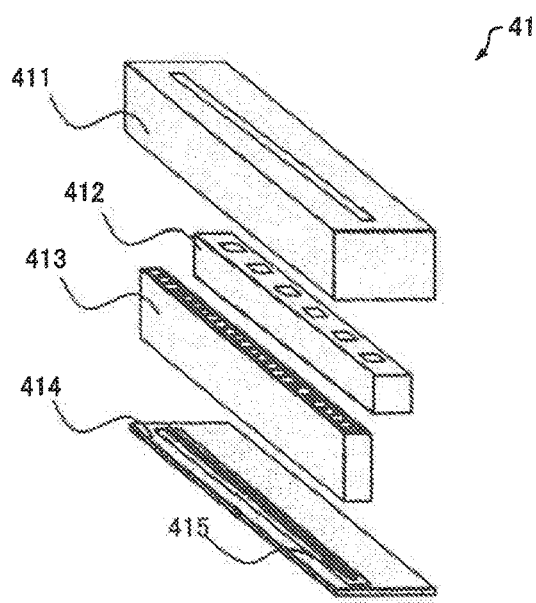
FIG. 3 is an exploded perspective view schematically showing a configuration of an image sensor module.

FIG. 3 is an exploded perspective view schematically showing a configuration of the image sensor module 41. In the example shown in FIG. 3, the image sensor module 41 includes a case 411, a light source 412, a lens 413, a module substrate 414, and an image reader chip 415 (semiconductor device) for reading an image. The light source 412, the lens 413, and the image reader chip 415 are housed between the case 411 and the module substrate 414. The case 411 is provided with a slit. The light source 412 includes, for example, R,G, and B light emitting diodes (LEDs), and sequentially causes the R,G, and B light emitting diodes (a red LED, a green LED, and a blue LED) to emit light by rapidly switching the light emitting diodes. The light emitted by the light source 412 is applied to the medium to be read via the slit, and the light from the medium to be read is input into the lens 413 via the slit. The lens 413 guides the input light to the image reader chips 415.

Figure 4:
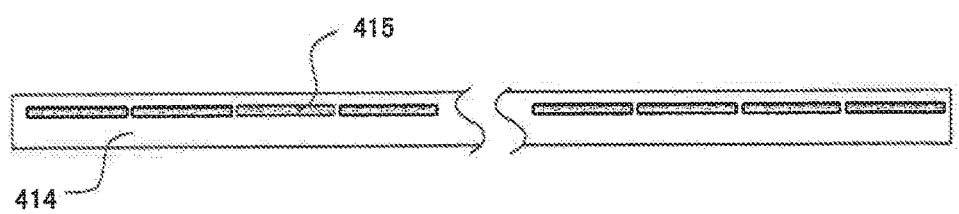
FIG. 4 is a plan view schematically showing an arrangement of image reader chips.
Figure 4:
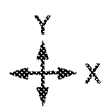

FIG. 4 is a plan view schematically showing an arrangement of the image reader chip 415. As shown in FIG. 4, a plurality of image reader chips 415 are arranged side by side on the module substrate 414 in a unidimensional direction (the X axis direction in FIG. 4). Each of the plurality of image reader chips 415 includes a large number of light receiving elements 111 that are arranged in a line (see FIGS. 6 and 8). The more densely the light receiving elements 111 of the plurality of image reader chips 415 are provided, the higher image reading resolution of the scanner unit 3 can be achieved. Also, by providing a greater number of image reader chips 415, it is possible to implement a scanner unit 3 that can also read a large image.

1.2 Functional Configuration of Scanner Unit (Image Reader Device)

Figure 5:
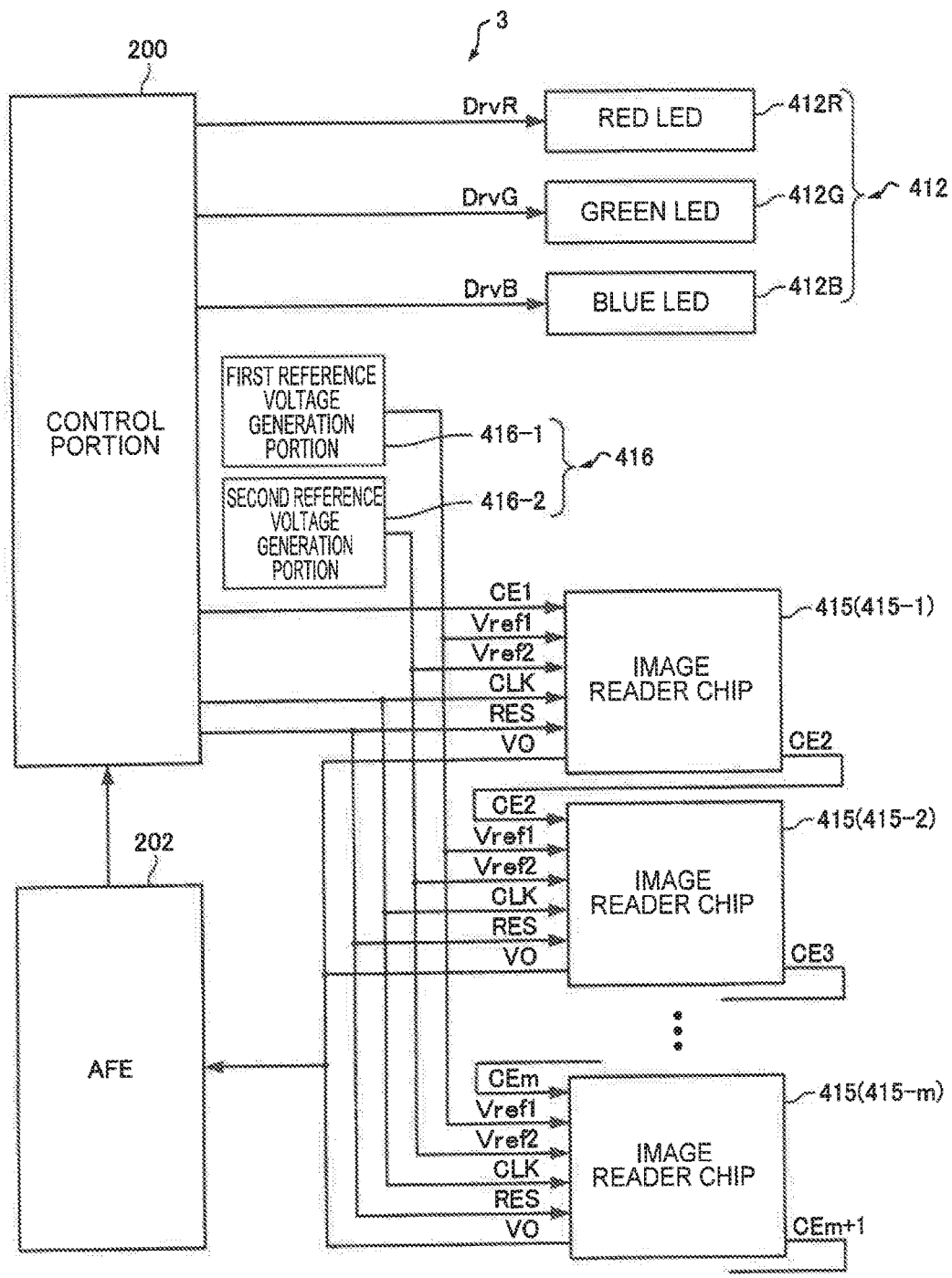
FIG. 5 is a diagram showing a functional configuration example of the scanner unit.

FIG. 5 is a functional configuration diagram of the scanner unit 3. In the example shown in FIG. 5, the scanner unit 3 includes a control portion 200, an analog front end (AFE) 202, a light source 412, a plurality of image reader chips 415, and a reference voltage generation portion 416. As described above, the light source 412 includes a red LED 412R, a green LED 412G, and a blue LED 412B, and the plurality of image reader chips 415 are arranged on the module substrate 414. The reference voltage generation portion 416 includes a first reference voltage generation portion 416-1 and a second reference voltage generation portion 416-2. The reference voltage generation portion 416 generates and outputs a voltage supplied commonly to the plurality of image reader chips 415. Also, it is possible to provide a plurality of red LEDs 412R, a plurality of green LEDs 412G, and a plurality of blue LEDs 412B. Furthermore, the control portion 200, the analog front end (AFE) 202, and the reference voltage generation portion 416 may be provided on the module substrate 414 or a substrate (not shown) different from the module substrate 414. Also, the control portion 200, the analog front end (AFE) 202, and the reference voltage generation portion 416 each may be implemented by an integrated circuit (IC).

The control portion 200 supplies a drive signal DrvR to the red LED 412R every 3 T for a fixed exposure time Δt so as to cause the red LED 412R to emit light, where T represents an image reading cycle. Likewise, the control portion 200 supplies a drive signal DrvG to the green LED 412G every 3 T for the exposure time Δt so as to cause the green LED 412G to emit light, and also supplies a drive signal DrvB to the blue LED 412B every 3 T for the exposure time Δt so as to cause the blue LED 412B to emit light. During the reading cycle T, the control portion 200 causes only one of the red LED 412R, the green LED 412G, and the blue LED 412B to emit light.

Also, the control portion 200 supplies a clock signal CLK and a resolution setting signal RES commonly to the plurality of image reader chips 415. The clock signal CLK is an operating clock signal for the image reader chips 415, and the resolution setting signal RES is a signal for setting an image reading resolution of the scanner unit 3. Hereinafter, it is assumed that the resolution setting signal RES is a 2-bit signal, in which when the resolution setting signal RES indicates "00", the resolution is set to 1200 dpi. when the resolution setting signal RES indicates "01", the resolution is set to 600 dpi, and when the resolution setting signal RES indicates "10", the resolution is set to 300 dpi.

The plurality of image reader chips 415 perform operations in synchronization with the clock signal CLK when a chip enable signal CEi (i=1 to m) is made active (high pulse in the present embodiment), and in response to the red LED 412R, the green LED 412G, or the blue LED 412B emitting light, each light receiving element 111 generates an image signal Vo having image information with the resolution set by the resolution setting signal RES based on the light received from the image formed on the medium to be read and outputs the generated image signal Vo.

The reference voltage generation portion 416 is composed of the first reference voltage generation portion 416-1 and the second reference voltage generation portion 416-2. The first reference voltage generation portion 416-1 generates a first reference voltage Vref1 and supplies the generated voltage commonly to the plurality of image reader chips 415-i. The second reference voltage generation portion 416-2 also generates a second reference voltage Vref2 and supplies the generated voltage commonly to the plurality of image reader chips 415-i. In the first embodiment, the first reference voltage Vref1 and the second reference voltage Vref2 are used to correct variations in output characteristics between the plurality of image reader chips 415-i. The method for correcting variations will be described together with a detailed description of circuit configuration and operations given later.

The analog front end (AFE) 202 receives the image signals Vo output from the plurality of image reader chips 415-i, performs amplification processing and A/D conversion processing on the image signals Vo so as to convert the signals to a digital signals each including a digital value corresponding to the amount of light received by the light receiving element 111, and sequentially transmits each digital signal to the control portion 200.

The control portion 200 receives each digital signal sequentially transmitted from the analog front end (AFE) 202, and generates read image information regarding the image read by the image sensor module 41.

1.3 Circuit Configuration and Operations of Image Reader Chip (Semiconductor Device)

Figure 6:
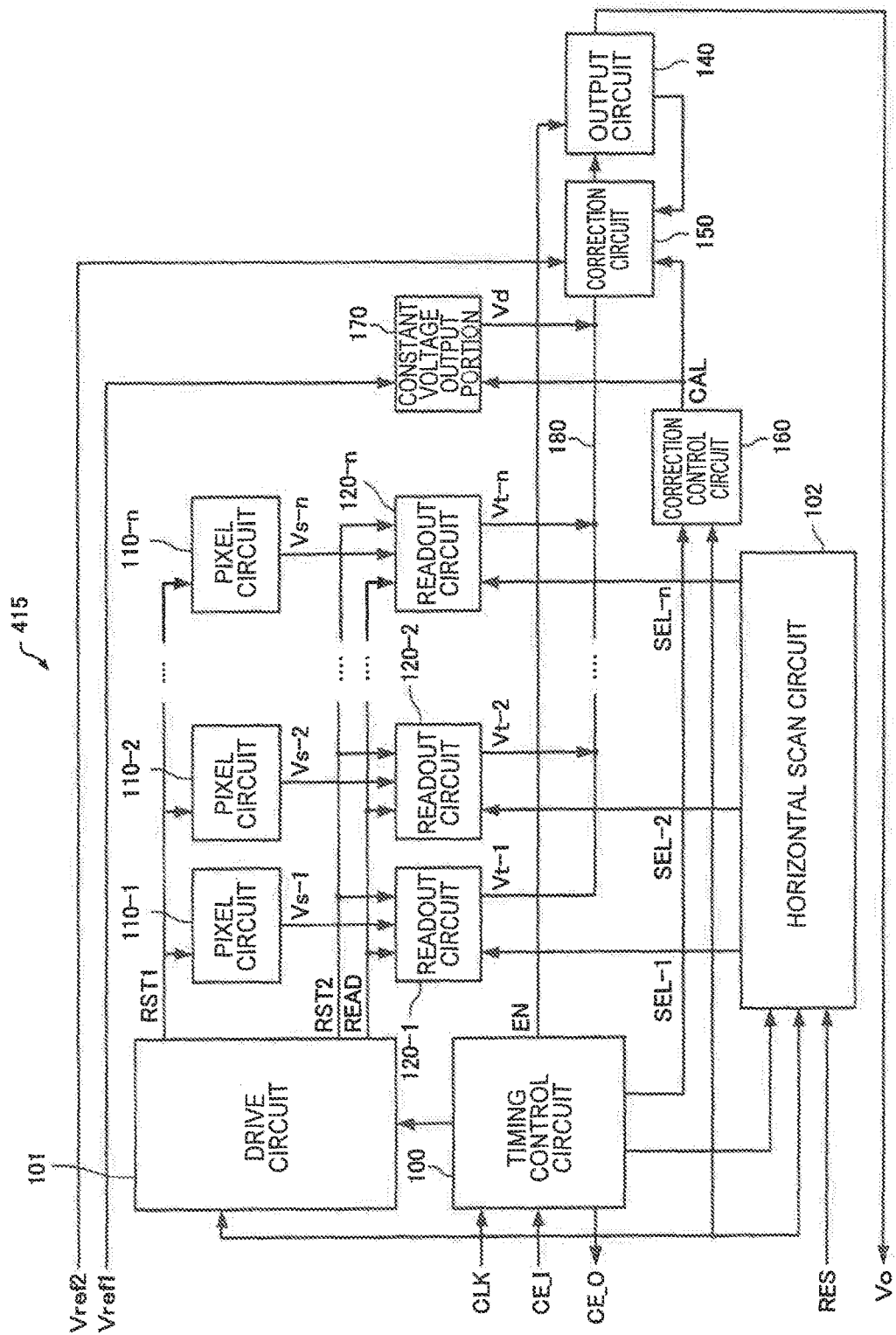
FIG. 6 is a diagram showing a functional configuration example of an image reader chip.
Figure 7:
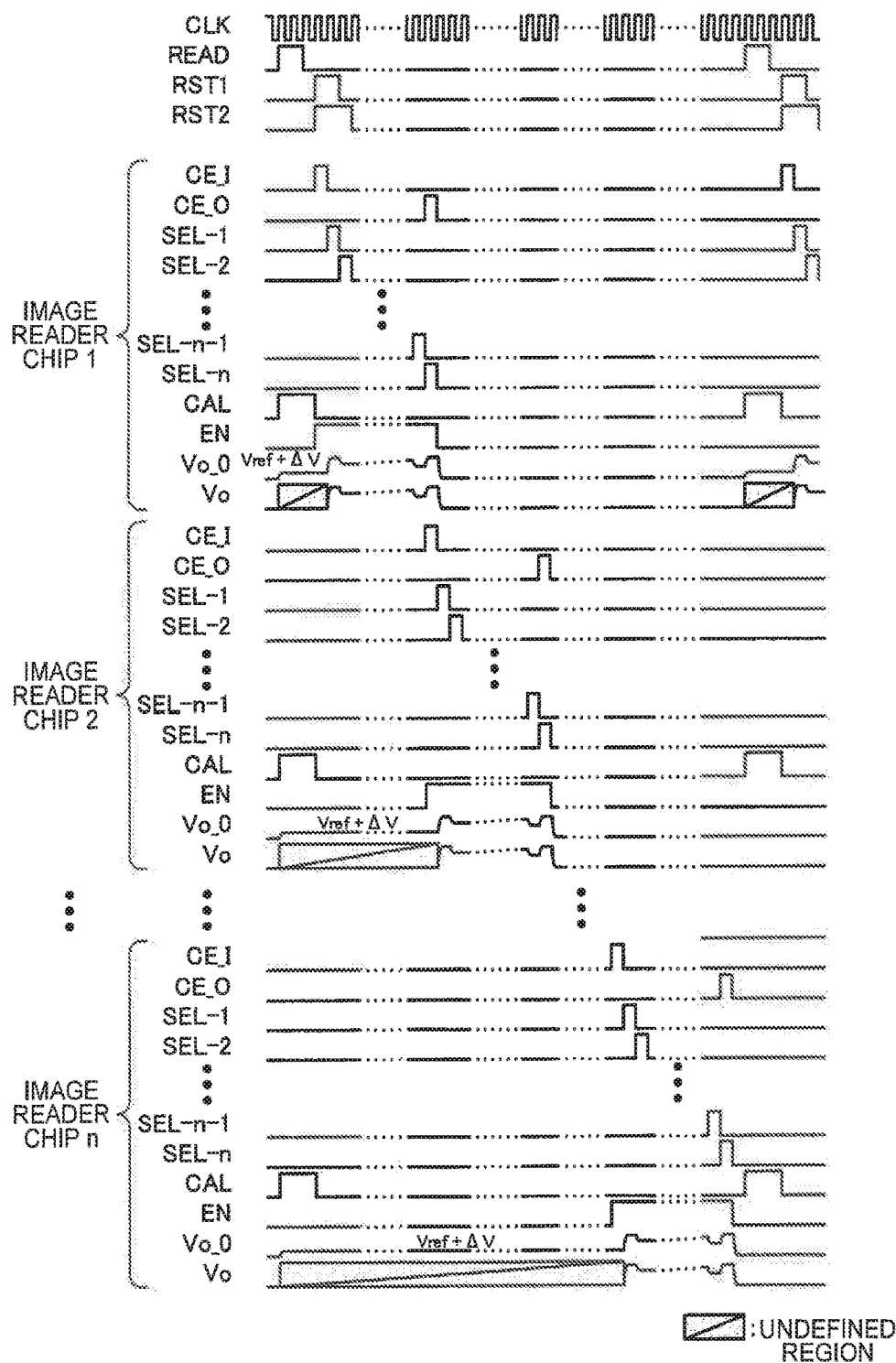
FIG. 7 is a timing chart according to a first embodiment.

FIG. 6 is a functional configuration diagram of an image reader chip 415. FIG. 7 is a timing chart diagram of the signals related to the operations of the plurality of image reader chips 415 in the case where the image reading resolution of the scanner unit 3 is set to 1200 dpi. The present embodiment will be described assuming that the resolution is 1200 dpi, but the resolution may be set to 600 dpi or 300 dpi, or may be set to any other value.

The image reader chip 415 shown in FIG. 6 includes a timing control circuit 100, a drive circuit 101, a horizontal scan circuit 102, a plurality of pixel circuits 110-$j$ (j=1 to n) (the pixel portions in the present embodiment), a plurality of readout circuits 120-$j$ (j=1 to n) (the readout circuit portions in the present embodiment), an output circuit 140, a correction circuit 150, a correction control circuit 160, and a constant voltage output circuit 170 (the constant voltage output portion in the present embodiment).

The timing control circuit 100 includes a counter (not shown) that counts the pulse of the clock signal CLK and initializes the count value every reading cycle T, and the timing control circuit 100 generates, based on an output value (count value) of the counter, a control signal for controlling the operations of the drive circuit 101, a control signal for controlling the operations of the horizontal scan circuit 102, and a control signal for controlling the operations of the correction control circuit 160.

Also, the timing control circuit 100 generates a selection signal SEL-1 (high level selection signal) that is made active for a fixed period of time in response to a chip enable signal CE_I input into the image reader chip 415 being active (high pulse), and outputs the generated signal, Furthermore, when the timing control circuit 100 outputs the last selection signal SEL-n, the timing control circuit 100 outputs an active (high pulse) chip enable signal CE_O to the next image reader chip 415.

The drive circuit 101 generates, based on the control signals from the timing control circuit 100, a first reset signal RST1 and a second reset signal RST2 that synchronize with the clock signal CLK that is made active (high level in the present embodiment) for a fixed period of time at a predetermined timing before the red LED 412R, the green LED 412G, or the blue LED 412B emits light during the image reading cycle T (see FIG. 7). The first reset signal RST1 is supplied commonly to all of the plurality of pixel circuits 110-j (j=1 to n), and the second reset signal RST2 is supplied commonly to all of the plurality of readout circuits 120-j (j=1 to n).

Also, the drive circuit 101 generates, based on the control signals from the timing control circuit 100, a readout signal READ that synchronizes with the clock signal CLK that is made active (high level in the present embodiment) for a fixed period of time at a predetermined timing after the red LED 412R, the green LED 412G, or the blue LED 412B finishes emitting light during the reading cycle T (see FIG. 7). The readout signal READ is supplied commonly to all of the plurality of readout circuits 120-j (j=1 to n).

The plurality of pixel circuits 110-j (j=1 to n) are each initialized by the first reset signal RST1 from the drive circuit 101, and thereafter output a plurality of pixel signals Vs-j (j=1 to n) corresponding to the light received from the medium to be read as a result of the light emission of the red LED 412R, the green LED 412G, or the blue LED 412B for the exposure time Δt.

The plurality of readout circuits 120-j (j=1 to n) are each initialized by the second reset signal RST2 from the drive circuit 101, and thereafter store electric charges corresponding to a plurality of pixel signals Vs-j (j=1 to n) read out from the plurality of pixel circuits 110-j (j=1 to n) when the readout signal READ supplied from the drive circuit 101 is made active (high level in the present embodiment).

Furthermore, the electric charges corresponding to the plurality of pixel signals Vs-j (j=1 to n) stored in the plurality of readout circuits 120-j (j=1 to n) are output to a transfer interconnect 180 as a plurality of pixel signals Vt-j (j=1 to n) in accordance with a plurality of selection signals SEL-j (j=1 to n) input from the horizontal scan circuit 102.

The horizontal scan circuit 102 sequentially generates, based on the control signals from the timing control circuit 100 and the resolution setting signal RES, a plurality of selection signals SEL-j (j=1 to n) that synchronize with the clock signal CLK that is made active (high level in the present embodiment) for a fixed period of time at a predetermined timing before each readout signal READ is made active (high level) during a reading cycle T (after the active (high level) readout signal READ is changed from the active state (high level) to the inactive state (low level) in the previous reading cycle T) (see FIG. 7). The horizontal scan circuit 102 generates a plurality of selection signals SEL-j (j=1 to n) that are made active (high level) in sequence by an amount corresponding to one cycle of the clock signal CLK when the resolution setting signal RES indicates "00" (when the resolution is set to 1200 dpi) (see FIG. 7). Although not shown in the diagram, when the resolution setting signal RES indicates "01" (when the resolution is set to 600 dpi), the horizontal scan circuit 102 sequentially generates a plurality of selection signals SEL-j (j=1 to n), two of which are simultaneously made active (high level) in sequence by an amount corresponding to two cycles of the clock signal CLK. When the resolution setting signal RES indicates "10" (when the resolution is set to 300 dpi), the horizontal scan circuit 102 sequentially generates a plurality of selection signals SEL-j (j=1 to n), four of which are simultaneously made active (high level) in sequence by an amount corresponding to four cycles of the clock signal CLK.

When an output enable signal EN input from the timing control circuit 100 is made active (high level in the present embodiment), and the plurality of selection signals SEL-j (j=1 to n) are sequentially transferred to the transfer interconnect 180, the output circuit 140 sequentially amplifies the plurality of pixel signals Vt-j (j=1 to n), and outputs an image signal Vo containing the plurality of amplified pixel signals (j=1 to n). The output enable signal EN synchronizes with the clock signal CLK, and is made active (high level) when a correction signal CAL, which will be described later, is at least made inactive (low level in the present embodiment), and is made inactive (low level) when the last selection signal SEL-n is changed from the active state (high level) to the inactive state (low level) (see FIG, 7), The correction circuit 150 stores a correction component based on a correction output voltage Vo_0 and the second reference voltage Vref2 during a period in which the correction signal CAL is active (high level in the present embodiment), and outputs, to the output circuit 140, a signal with the correction component being taken into consideration during a period in which the correction signal CAL is inactive (low level).

The correction control circuit 160 outputs the correction signal CAL for controlling the correction circuit 150 and the constant voltage output circuit 170. For example, the correction signal CAL is made active (high level) when the readout signal READ is made active (high level). Also, the correction signal CAL is made inactive (low level) before at least the first selection signal SEL-1 is made active (high level) (see FIG. 7).

The constant voltage output circuit 170 generates a dummy voltage Vd based on the first reference voltage Vref1 and outputs the generated voltage to the transfer interconnect 180. Here, the constant voltage output circuit 170 supplies the dummy voltage Vd to the transfer interconnect 180 during a period in which at least the correction signal CAL is active (high level).

1.4 Circuit Configuration and Operations

The plurality of pixel circuits 110-j (j=1 to n) shown in FIG. 6 all have the same circuit configuration. Hereinafter, the configuration and operations of a pixel circuit will be described by collectively representing the plurality of pixel circuits 110-j (j=1 to n) by "pixel circuit 110", and collectively representing the plurality of pixel signals Vs-j (j=1 to n) of the plurality of pixel circuits 110-j (j=1 to n) by "pixel signal Vs".

Figure 8:
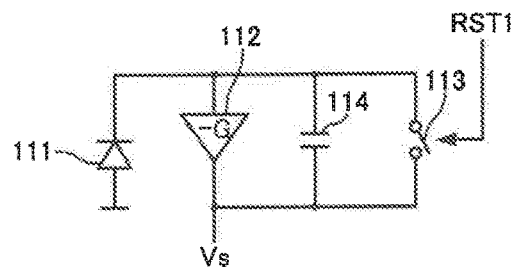
FIG. 8 is a diagram showing a circuit configuration example of a pixel circuit.

FIG. 8 is a configuration diagram of a pixel circuit 110 (the pixel portion in the present embodiment). As shown in FIG. 8, the pixel circuit 110 includes a light receiving element 111, an inverter amplifier portion 112, a switch 113, and a capacitive element 114.

The light receiving element 111 receives light (the light from the image formed on the medium to be read in the present embodiment) and converts the received light to an electric signal (photoelectric conversion), In the present embodiment, the light receiving element 111 is a photodiode, with its anode being grounded and its cathode being electrically connected to an input terminal of the inverter amplifier portion 112.

The inverter amplifier portion 112 is electrically connected to the light receiving element 111, and amplifies the signal generated through photoelectric conversion by the light receiving element 111. To be specific, the inverter amplifier portion 112 has an input terminal that is electrically connected to the cathode of the light receiving element 111, and outputs, from its output terminal, a voltage obtained by multiplying the voltage at the input terminal of the inverter amplifier portion 112 by a factor of –G. The output voltage of the inverter amplifier portion 112 serves as a pixel signal Vs of the pixel circuit 110.

The switch 113 is electrically connected to both ends (the input terminal and the output terminal) of the inverter amplifier portion 112 in parallel to the inverter amplifier portion 112. The switch 113 has a control terminal that receives an input of the first reset signal RST1. When the first reset signal RST1 is active (high level in the present embodiment), both ends of the switch 113 are electrically connected. When the first reset signal RST1 is inactive (low level in the present embodiment), both ends of the switch 113 are electrically disconnected. As described above, the first reset signal RST1 is made active (high level) for a fixed period of time at a predetermined timing before the red LED 412R, the green LED 412G, or the blue LED 412B emits light (before the exposure time Δt). Because both ends of the switch 113 are electrically connected at this time, both ends of the capacitive element 114 are shorted out, and the accumulated electric charges are reset.

Also, the switch 113 may be, for example, an NMOS transistor in which the first reset signal RST1 is input into the gate terminal, one of the source terminal and the drain terminal is electrically connected to the input terminal of the inverter amplifier portion 112, and the other of the source terminal and the drain terminal is electrically connected to the output terminal of the inverter amplifier portion 112.

The capacitive element 114 is electrically connected to both ends (the input terminal and the output terminal) of the inverter amplifier portion 112 in parallel to the inverter amplifier portion 112. That is, the capacitive element 114 functions as a feedback capacitor provided in a signal feedback path extending from the output terminal to the input terminal of the inverter amplifier portion 112.

Referring back to FIG. 6, the plurality of readout circuits 120-$j$ ($j=1$ to n) all have the same circuit configuration. Hereinafter, the configuration and operations of a readout circuit will be described by collectively representing the plurality of readout circuits 120-$j$ ($j=1$ to n) by "readout circuit 120", collectively representing the plurality of pixel signals Vt-j ($j=1$ to n) of the plurality of readout circuits 120-$j$ ($j=1$ to n) by "pixel signal Vt", and collectively representing the plurality of selection signals SEL-j ($j=1$ to n) by "selection signal SEL".

Figure 9:
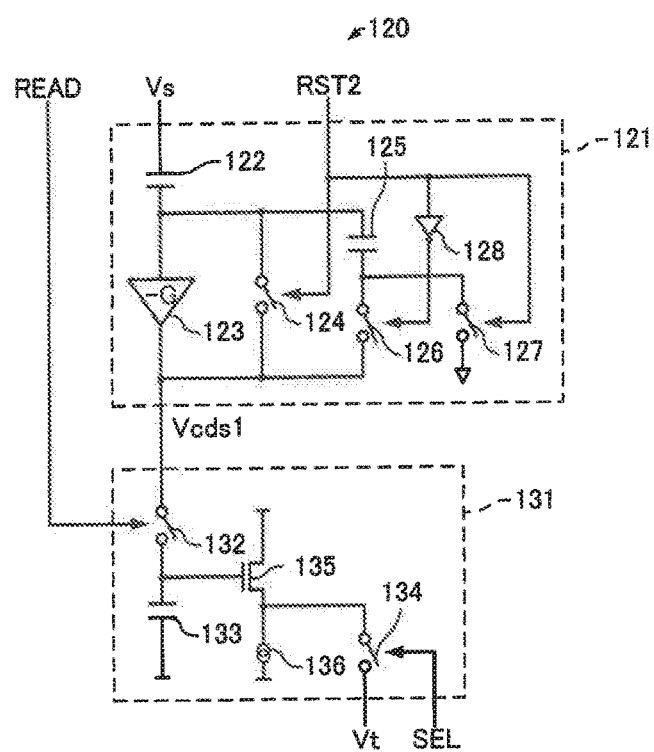
FIG. 9 is a diagram showing a circuit configuration example of a readout circuit portion.

FIG. 9 is a configuration diagram of a readout circuit 120 (the readout circuit portion in the present embodiment), As shown in FIG. 9, the readout circuit 120 includes a noise reduction circuit 121 and a memory circuit 131.

The noise reduction circuit 121 includes a capacitive element 122, an inverter amplifier portion 123, a switch 124, a capacitive element 125, a switch 126, and a switch 127.

The capacitive element 122 is connected to the pixel circuit 110. To be specific, the capacitive element 122 has one end that is electrically connected to the output terminal of the inverter amplifier portion 112 and another end that is electrically connected to an input terminal of the inverter amplifier portion 123.

The input terminal of the inverter amplifier portion 123 is connected to the other end of the capacitive element 122, and the inverter amplifier portion 123 outputs, from its output terminal, a voltage obtained by multiplying the voltage at the input terminal by a factor of -G. The output voltage of the inverter amplifier portion 123 serves as a pixel signal Vcds output from the noise reduction circuit 121.

The switch 124 is electrically connected to both ends (the input terminal and the output terminal) of the inverter amplifier portion 123 in parallel to the inverter amplifier portion 123.

The capacitive element 125 has one end that is electrically connected to the input terminal of the inverter amplifier portion 123 and another end that is electrically connected to one end of the switch 126.

The switch 126 has one end that is electrically connected to the other end of the capacitive element 125 and another end that is electrically connected to the output terminal of the inverter amplifier portion 123.

The switch 127 has one end that is electrically connected to the other end of the capacitive element 125 and another end that receives a supply of a predetermined voltage Va (for example, 2.4 V).

The noise reduction circuit 121 as configured described above functions as a CDS (correlated double sampling) circuit that performs noise cancellation on the pixel signal Vs of the pixel circuit 110 by using the capacitive element 122 and also performs invert amplification by using the inverter amplifier portion 123.

The second reset signal RST2 is input commonly to the respective control terminals of the two switches, namely, the switch 124 and the switch 127. When the second reset signal RST2 is active (high level in the present embodiment), both ends of the switch 124 and the switch 127 are electrically connected. When the second reset signal RST2 is inactive (low level in the present embodiment), both ends of the switch 124 and the switch 127 are electrically disconnected. Also, the second reset signal RST2 is input into the control terminal of the switch 126 via a logical inversion element 128. That is, when the second reset signal RST2 is active (high level), the control terminal of the switch 126 receives an inactive input (low level), and both ends of the switch 126 are electrically disconnected. When the second reset signal RST2 is inactive (low level), the control terminal of the switch 126 receives an active input (high level), and both ends of the switch 126 are electrically connected.

As described above, the second reset signal RST2 is made active (high level) for a fixed period of time at a predetermined timing before the red LED 412R, the green LED 412G, or the blue LED 412B emits light (before the exposure time Δt). At this time, both ends of the switch 124 and the switch 127 are electrically connected, and the control terminal of the switch 126 receives a logical inverse signal of the second reset signal RST2 obtained through logical inversion of the second reset signal RST2 by the logical inversion element 128, and both ends of the switch 126 are electrically disconnected. Accordingly, the input and output terminals of the inverter amplifier portion 123 are short-circuited, as a result of which the input terminal of the inverter amplifier portion 123 has a predetermined voltage Vb, a potential difference Vb-Va occurs in both ends of the capacitive element 125, and electric charges corresponding to the potential difference are accumulated (reset).

After that, when the second reset signal RST2 is made inactive (low level), both ends of the switch 126 are electrically connected, and both ends of the switch 124 and the switch 127 are electrically disconnected. At this time, the capacitive element 125 is electrically connected to each of both ends of the inverter amplifier portion 123, and functions as a feedback capacitor.

Also, the switch 124 may be, for example, an NMOS transistor in which the second reset signal RST2 is input into the gate terminal, one of the source terminal and the drain terminal is electrically connected to the input terminal of the inverter amplifier portion 123, and the other of the source terminal and the drain terminal is electrically connected to the output terminal of the inverter amplifier portion 123.

Also, the switch 126 may be, for example, an NMOS transistor in which the inverse signal of the second reset signal RST2 is input into the gate terminal, one of the source terminal and the drain terminal is electrically connected to the other end of the capacitive element 125, and the other of the source terminal and the drain terminal is electrically connected to the output terminal of the inverter amplifier portion 123.

Also, the switch 127 may be, for example, an NMOS transistor in which the second reset signal RST2 is input into the gate terminal, one of the source terminal and the drain terminal is electrically connected to the other end of the capacitive element 125, and the other of the source terminal and the drain terminal receives a supply of a predetermined voltage Va (for example, 2.4 V).

The memory circuit 131 includes a switch 132, a capacitive element 133, a switch 134, an NMOS transistor 135, and a constant current source 136.

The switch 132 is electrically connected to the noise reduction circuit 121. To be specific, the switch 132 has one end that is electrically connected to the output terminal of the inverter amplifier portion 123 (the output terminal of the noise reduction circuit 121), and another end that is electrically connected to one end of the capacitive element 133.

The capacitive element 133 has one end that is electrically connected to the other end of the switch 132 and another end that supplies a supply of a predetermined reference potential (for example, a ground potential of 0 V).

The NMOS transistor 135 has a gate terminal that is electrically connected to the other end of the switch 132, a drain terminal that is connected to an arbitrary constant voltage (for example, 3.3 V), and a source terminal that is electrically connected to one end of the constant current source 136.

The NMOS transistor 135 is desirably a depletion type field-effect transistor. With the use of a depletion type field-effect transistor, the drop in voltage between the gate terminal and the source terminal of the NMOS transistor 135 is reduced to expand the dynamic range, as a result of which the accuracy of reading is improved.

The switch 134 has one end that is electrically connected to the source terminal of the NMOS transistor 135 and another end that is electrically connected to the transfer interconnect 180. The voltage output when the switch 134 is in an electrically connected state serves as the voltage output from the memory circuit 131, namely, the pixel signal Vt of the readout circuit 120.

The constant current source 136 has one end that is electrically connected to the source terminal of the NMOS transistor 135 and another end that receives a supply of a predetermined reference potential (for example, a ground potential of 0 V). That is, the NMOS transistor 135 and the constant current source 136 together form a source follower circuit, and output the pixel signal Vt via the switch 134.

The switch 132 has a control terminal that receives an input of the readout signal READ. When the readout signal READ is active (high level), both ends of the switch 132 are electrically connected. When the readout signal READ is inactive (low level in the present embodiment), both ends of the switch 132 are electrically disconnected. As described above, the readout signal READ is made active (high level) for a fixed period of time at a predetermined timing after the red LED 412R, the green LED 412G, or the blue LED 412B finishes emitting light. At this time, both ends of the switch 132 are electrically connected, and thus the capacitive element 133 and the noise reduction circuit 121 are electrically connected, and electric charges corresponding to the pixel signal Vcds are stored in the capacitive element 133.

Also, the switch 134 has a control terminal that receives an input of the selection signal SEL. When the selection signal SEL is active (high level), both ends of the switch 134 are electrically connected. When the selection signal SEL is inactive (low level in the present embodiment), both ends of the switch 134 are electrically disconnected.

As described above, the selection signal SEL is sequentially made active (high level) for a fixed period of time at a predetermined timing after the readout signal READ is changed from the active state (high level) to the inactive state (low level). When the selection signal SEL is made active (high level), one end of the capacitive element 133 is electrically connected to the transfer interconnect 180 via the NMOS transistor 135, and the pixel signal Vt is output.

Here, the switch 132 may be, for example, an NMOS transistor in which the readout signal READ is input into the gate terminal, one of the source terminal and the drain terminal receives a supply of the pixel signal Vcds, and the other of the source terminal and the drain terminal is electrically connected to one end of the capacitive element 133.

Also, the switch 134 may be, for example, an NMOS transistor in which the selection signal SEL is input into the gate terminal, one of the source terminal and the drain terminal is electrically connected to the source terminal of the NMOS transistor 135, and the other of the source terminal and the drain terminal is electrically connected to the transfer interconnect 180.

Figure 10:
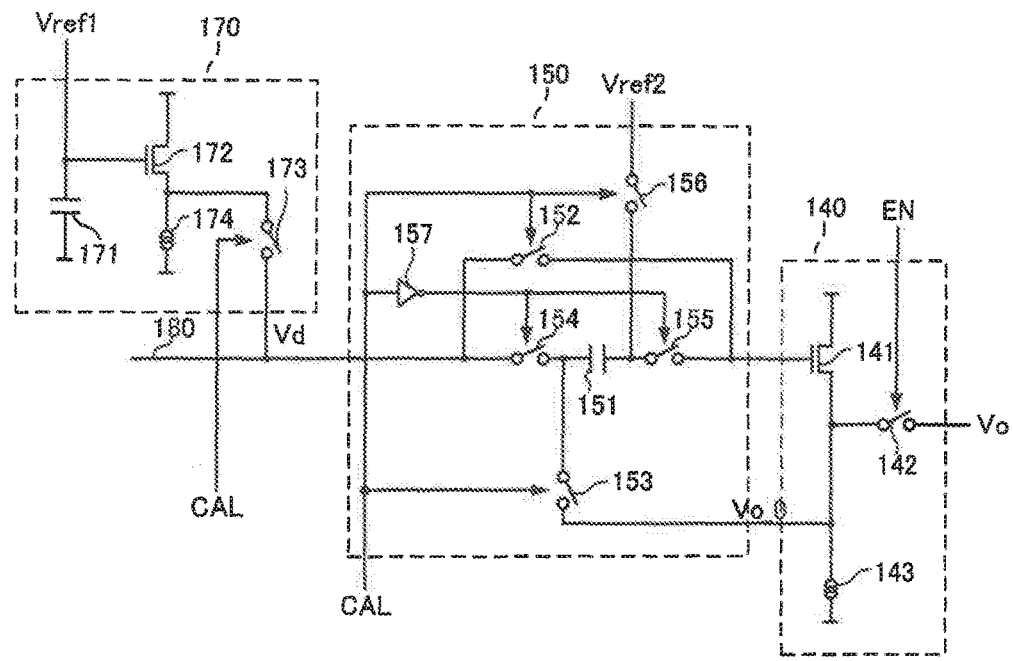
FIG. 10 is a diagram showing a circuit configuration of a constant voltage output portion, a correction circuit, and an output circuit according to the first embodiment.

FIG. 10 is a configuration diagram of the output circuit 140, the correction circuit 150, and the constant voltage output circuit 170.

As shown in FIG. 10, the constant voltage output circuit 170 includes a capacitive element 171, an NMOS transistor 172, a switch 173, and a constant current source 174.

The capacitive element 171 has one end that is electrically connected to the first reference voltage Vref1 and another end that receives a supply of a predetermined reference potential (for example, a ground potential of 0 V).

The NMOS transistor 172 has a gate terminal that is electrically connected to the first reference voltage Vref1, a drain terminal that receives a supply of an arbitrary constant voltage (for example, 3.3 V), and a source terminal that is electrically connected to the constant current source 174.

Here, the NMOS transistor 172 is desirably a depletion type field-effect transistor. With the use of a depletion type field-effect transistor, the drop in voltage between the gate terminal and the source terminal of the NMOS transistor 172 is reduced to expand the dynamic range, as a result of which the accuracy of reading is improved.

The switch 173 has one end that is electrically connected to the source terminal of the NMOS transistor 172 and another end that is electrically connected to the transfer interconnect 180.

The switch 173 has a control terminal that receives an input of the correction signal CAL. When the correction signal CAL is active (high level), both ends of the switch 173 are electrically connected. When the correction signal CAL is inactive (low level), both ends of the switch 173 are electrically disconnected. As described above, for example, the correction signal CAL is made active (high level) when the readout signal READ is changed to active (high level). Also, the correction signal CAL is made inactive (low level) before at least the first selection signal SEL-1 is made active (high level). Accordingly, the switch 173 is in an electrically connected state during a period in which the correction signal CAL is active (high level), and outputs the dummy voltage Vd generated by the first reference voltage Vref1 to the transfer interconnect 180.

The constant current source 174 has one end that is electrically connected to the source terminal of the NMOS transistor 172 and another end that receives a supply of a predetermined reference potential (for example, a ground potential of 0 V). That is, the NMOS transistor 172 and the constant current source 174 together form a source follower circuit and output the dummy voltage Vd via the switch 173.

Here, it is preferable that the constant voltage output circuit 170 has the same circuit configuration and component characteristics as those of the memory circuit 131. By configuring the constant voltage output circuit 170 to have the same circuit configuration and component characteristics, the image signal Vo can be corrected with a high degree of accuracy. Furthermore, it is preferable that the first reference voltage Vref1 takes the same value as the pixel signal Vcds in the dark state. By configuring the first reference voltage Vref1 to take the same value as the pixel signal Vcds in the dark state, it is possible to suppress degradation in the quality of read images (particularly in the dark state).

Also, the switch 173 may be, for example, an NMOS transistor in which the correction signal CAL is input into the gate terminal, one of the source terminal and the drain terminal is electrically connected to the source terminal of the NMOS transistor 172, the other of the source terminal and the drain terminal is electrically connected to the transfer interconnect 180.

As shown in FIG. 10, the correction circuit 150 includes a capacitive element 151, a switch 152, a switch 153, a switch 154, a switch 155, and a switch 156.

The capacitive element 151 (the capacitor in the present embodiment) has a first terminal that is electrically connected to the switch 154 and a second terminal that is electrically connected to the switch 155. The first terminal of the capacitive element 151 is also electrically connected to the switch 153, and the second terminal is also electrically connected to the switch 156.

The switch 152 has one end that is electrically connected to the transfer interconnect 180 and another end that is electrically connected to the output circuit 140.

The switch 153 has one end that is electrically connected to the first terminal of the capacitive element 151 and another end that receives a supply of the correction output voltage Vo_0 input from the output circuit 140.

The switch 154 has one end that is electrically connected to the first terminal of the capacitive element 151 and another end that is electrically connected to the transfer interconnect 180.

The switch 155 has one end that is electrically connected to the second terminal of the capacitive element 151 and another end that is connected to the output circuit 140.

The switch 156 has one end that is electrically connected to the second terminal of the capacitive element 151 and another end that receives a supply of the second reference voltage Vref2.

Also, the switch 152, the switch 153, and the switch 156 each have a control terminal that receives an input of the correction signal CAL, and the switch 154 and the switch 155 each have a control terminal that receives an input of the correction signal CAL via a logical inversion element 157. Accordingly, when the correction signal CAL is active (high level), the switch 152, the switch 153, and the switch 156 are electrically connected, and the switch 154 and the switch 155 that receive an input of a logical inverse signal of the correction signal CAL via the logical inversion element 157 are electrically disconnected. When, on the other hand, the correction signal CAL is inactive (low level), the switch 152, the switch 153, and the switch 156 are electrically disconnected, and the switch 154 and the switch 155 that receive an input of a logical inverse signal of the correction signal CAL via the logical inversion element 157 are electrically connected.

That is, when the correction signal CAL is active (high level), the first terminal of the capacitive element 151 is electrically connected to the correction output voltage Vo_0 via the switch 153, and the second terminal of the capacitive element 151 is electrically connected to the second reference voltage Vref2 via the switch 156. At this time, the transfer interconnect 180 and the output circuit 140 are electrically connected via the switch 152, When, on the other hand, the correction signal CAL is inactive (low level), the first terminal of the capacitive element 151 is electrically connected to the transfer interconnect 180, and the second terminal of the capacitive element 151 is electrically connected to the output circuit 140. That is, the capacitive element 151 (the capacitor in the present embodiment) is configured such that the first terminal is selectively connected to the transfer interconnect 180 and the second terminal is selectively connected to the output circuit 140.

As described above, the correction signal CAL is made active (high level) when at least the readout signal READ is changed to active (high level), and the correction signal CAL is made inactive (low level) before at least the first selection signal SEL-1 is made active (high level). That is, the selection signal SEL is inactive during a period in which the correction signal CAL is active (high level), and thus the pixel signal Vt is not supplied to the transfer interconnect 180 during the period in which the correction signal CAL is active (high level).

On the other hand, as described above, in the constant voltage output circuit 170, the switch 173 is in an electrically connected state during the period in which the correction signal CAL is active (high level), and thus the dummy voltage Vd generated by the first reference voltage Vref1 is supplied to the transfer interconnect 180.

That is, when the correction signal CAL is active (high level), the voltage of the transfer interconnect 180 is the dummy voltage Vd generated by the first reference voltage Vref1, and when the correction signal CAL is inactive (low level), the voltage of the transfer interconnect 180 is the pixel signal Vt output from the readout circuit 120.

Here, the switch 152 may be, for example, an NMOS transistor in which the correction signal CAL is input into the gate terminal, one of the source terminal and the drain terminal is electrically connected to the transfer interconnect 180, and the other of the source terminal and the drain terminal is electrically connected to the output circuit 140.

Also, the switch 153 may be, for example, an NMOS transistor in which the correction signal CAL is input into the gate terminal, one of the source terminal and the drain terminal is electrically connected to the first terminal of the capacitive element 151 and the other of the source terminal and the drain terminal receives a supply of the correction output voltage Vo_0.

Here, the switch 154 may be, for example, an NMOS transistor in which the inverse signal of the correction signal CAL is input into the gate terminal, one of the source terminal and the drain terminal is electrically connected to the first terminal of the capacitive element 151, and the other of the source terminal and the drain terminal is electrically connected the transfer interconnect 180.

Here, the switch 155 may be, for example, an NMOS transistor in which the inverse signal of the correction signal CAL is input into the gate terminal, one of the source terminal and the drain terminal is electrically connected to the second terminal of the capacitive element 151, and the other of the source terminal and the drain terminal is electrically connected to the output circuit 140.

Here, the switch 156 may be, for example, an NMOS transistor in which the correction signal CAL is input into the gate terminal, one of the source terminal and the drain terminal is electrically connected to the second terminal of the capacitive element 151, and the other of the source terminal and the drain terminal is electrically connected to the second reference voltage Vref2.

As shown in FIG. 10, the output circuit 140 includes an NMOS transistor 141, a switch 142, and a constant current source 143.

The NMOS transistor 141 has a gate terminal that is electrically connected to the correction circuit 150. That is, the NMOS transistor 141 is electrically connected to the transfer interconnect 180 via the switch 152 of the correction circuit 150 when the correction signal CAL is active (high level), and is electrically connected to the second terminal of the capacitive element 151 via the switch 155 of the correction circuit 150 when the correction signal CAL is inactive (low level). Also, the drain terminal receives a supply of an arbitrary constant voltage (for example, 3.3 V), and the source terminal is electrically connected to the constant current source 143.

Here, the NMOS transistor 141 is desirably a depletion type field-effect transistor. With the use of a depletion type field-effect transistor, the drop in voltage between the gate terminal and the source terminal of the NMOS transistor 141 is reduced to expand the dynamic range, as a result of which the accuracy of reading is improved.

The switch 142 has one end that is electrically connected to the source terminal of the NMOS transistor 141 and another end that outputs the image signal Vo.

The switch 142 has a control terminal that receives an input of the output enable signal EN. When the output enable signal EN is active (high level), both ends of the switch 142 are electrically connected. When the output enable signal EN is inactive (low level in the present embodiment), both ends of the switch 142 are electrically disconnected. Also, as described above, the output enable signal EN is made active (high level) when the correction signal CAL is at least inactive (high level), and is made inactive (low level) when the last selection signal SEL-n is changed from the active state (high level) to the inactive state (low level).

The constant current source 143 has one end that is electrically connected to the source terminal of the NMOS transistor 141 and another end that receives a supply of a predetermined reference potential (for example, a ground potential of 0 V), That is, the NMOS transistor 141 and the constant current source 143 together form a source follower circuit and output the image signal Vo via the switch 142.

Also, in the present embodiment, the NMOS transistor 141 is used to configure the output circuit 140, but the output circuit 140 may be configured by using an operational amplifier, or the like.

Correction of the image signal Vo is carried out in the manner described below by the output circuit 140, the correction circuit 150, and the constant voltage output circuit 170 shown in FIG. 10.

When the correction signal CAL is active (high level), only the dummy voltage Vd output by the constant voltage output circuit 170 is supplied to the transfer interconnect 180. At this time, the switch 152, the switch 153, and the switch 156 of the correction circuit 150 are electrically connected, and the switch 154 and the switch 155 that receive an input of the logical inverse signal of the correction signal CAL via the logical inversion element 157 are electrically disconnected. Accordingly, the dummy voltage Vd is supplied to the gate terminal of the NMOS transistor 141 of the output circuit 140 via the switch 152 of the correction circuit 150, and output from the source terminal. When the correction signal CAL is active (high level), the output enable signal EN is inactive (low level), the switch 142 of the output circuit 140 is in an electrically disconnected state, and the switch 153 of the correction circuit 150 is in an electrically connected state. Accordingly, the dummy voltage Vd is electrically connected to the first terminal of the capacitive element 151 of the correction circuit 150 via the NMOS transistor 141 of the output circuit 140 and the switch 153. That is, the constant voltage output circuit 170 is selectively connected to the first terminal of the capacitor via the output circuit 140. Also, the second terminal of the capacitive element 151 is connected to the second reference voltage Vref2 via the switch 156 of the correction circuit 150.

Accordingly, when the correction signal CAL is active (high level), electric charges in an amount corresponding to a difference between the second reference voltage Vref2 and the correction output voltage Vo_0 supplied as a result of the dummy voltage Vd being connected via the NMOS transistor 141 of the output circuit 140 and the switch 153 are stored in the capacitive element 151 of the correction circuit 150.

When the correction signal CAL is inactive (low level), the pixel signal Vt output from the readout circuit 120 in accordance with the selection signal SEL is supplied to the transfer interconnect 180. At this time, the switch 152, the switch 153, and the switch 156 of the correction circuit 150 are electrically disconnected, the switch 154 and the switch 155 that receive an input of the logical inverse signal via the logical inversion element 157 are electrically connected, and the transfer interconnect 180 is connected to the first terminal of the capacitive element 151. Also, the second terminal of the capacitive element 151 is connected to the NMOS transistor 141 of the output circuit 140 via the switch 155, and at this time, the gate voltage of the NMOS transistor 141 is a voltage obtained by correcting the pixel signal Vt by the electric charges stored in the capacitive element 151. The mechanism of correction of the image signal Vo according to the present embodiment will be described below.

1.5 Method for Correcting Image Signal between Image Reader Chips

The mechanism of correction of the image reader chips 415 according to the first embodiment will be described with reference to FIGS. 6, 9, and 10 by using two different periods in which the correction signal CAL is active (high level) and in which the correction signal CAL is inactive (low level).

As described above, when the correction signal CAL is active (high level), electric charges in an amount corresponding to a difference between the second reference voltage Vref2 supplied to the second terminal of the capacitive element 151 via the switch 156 and the correction output voltage Vo_0 supplied as a result of the dummy voltage Vd being connected to the first terminal of the capacitive element 151 via the switch 152, the NMOS transistor 141 of the output circuit 140, and the switch 153 are stored in the capacitive element 151 of the correction circuit 150.

Here, the gate voltage of the NMOS transistor 141 of the output circuit 140 is the dummy voltage Vd, and the dummy voltage Vd is an output of the source follower circuit of the NMOS transistor 172 of the constant voltage output circuit 170 based on the first reference voltage Vref1.

Accordingly, electric charges q1 stored in the capacitive element 151 of the correction circuit 150 during the period in which the correction signal CAL is active (high level) is obtained by Equation (1), where the capacitance of the capacitive element 151 of the correction circuit 150 is represented by C, the threshold voltage of the NMOS transistor 172 of the constant voltage output circuit 170 is represented by Vth1, the threshold voltage of the NMOS transistor 141 of the output circuit 140 is represented by Vth2, and other circuit variations are represented by Vα.

$$q1 = C \times (Vref1 - Vref2 - Vth1 - Vth2 + V\alpha) \qquad [\text{Math. 1}]$$

Alternatively, when the correction signal CAL is inactive (low level), the pixel signal Vt output from the readout circuit 120 in accordance with the selection signal SEL is supplied to the transfer interconnect 180. At this time, the switch 152, the switch 153, and the switch 156 of the correction circuit 150 are electrically disconnected, the switch 154 and the switch 155 that receive an input of the logical inverse signal via the logical inversion element 157 are electrically connected, and the transfer interconnect 180 is electrically connected to the first terminal of the capacitive element 151. Also, the second terminal of the capacitive element 151 is connected to the NMOS transistor 141 of the output circuit 140 via the switch 155, and at this time, the gate voltage of the NMOS transistor 141 is a voltage obtained by correcting the pixel signal Vt by the electric charges stored in the capacitive element 151.

Accordingly, the image signal Vo output from the output circuit 140 during the period in which the correction signal CAL is inactive (low level) is obtained by Equation (2), where the capacitance of the capacitive element 151 of the correction circuit 150 is represented by C, the electric charges stored in the capacitive element 151 is represented by q2, the threshold voltage of the NMOS transistor 135 of the memory circuit 131 is represented by Vth3, the threshold voltage of the NMOS transistor 141 of the output circuit 140 is represented by Vth2, and other variations are represented by Vβ.

$$Vo = Vcds - Vth3 - q2/C - Vth2 + V\beta \qquad [\text{Math. 2}]$$

Because electric charges are stored in the capacitive element 151 of the correction circuit 150 during the period in which the correction signal CAL is active (high level), and correction is performed by using the electric charges stored in the capacitive element 151 of the correction circuit 150 during the period in which the correction signal CAL is inactive (low level), the electric charges q1 and q2 stored in the capacitive element 151 are equal. Accordingly, the image signal Vo output from the output circuit 140 according to the present embodiment based on Equations (1) and (2) is obtained by Equation (3).

$$Vo = Vcds - (Vref1 - Vref2 + (Vth1 - Vth3 + V\beta - V\alpha)) \qquad [\text{Math. 3}]$$

If the memory circuit 131 and the constant voltage output circuit 170 have the same circuit configuration and component characteristics, Vth1≈Vth3 is obtained. Furthermore, because other variations Vα and Vβ occur at equivalent current paths within the same chip, if Vα≈Vβ, the image signal Vo output from the output circuit 140 is obtained by Equation (4).

$$Vo = Vcds - (Vref1 - Vref2) \qquad [\text{Math. 4}]$$

From Equation (4) given above, in the present embodiment, the image signal Vo is obtained only from the first reference voltage Vref1 and the second reference voltage Vref2 that are commonly supplied to the plurality of image reader chips 415, and the pixel signal Vcds that has been generated by photoelectrically converting, by the pixel circuit 110, the light from the image formed on the medium to be read and whose noise has been reduced by the noise reduction circuit 121, and characteristics variations between the plurality of image reader chips 415 are corrected.

In Equation (4) given above, the first reference voltage Vref1 and the second reference voltage Vref2 preferably take the same voltage value. By doing so, the electric charges stored in the capacitive element 151 of the correction circuit 150 can be reduced. Furthermore, the first reference voltage Vref1 and the second reference voltage Vref2 may be generated by branching from the same reference voltage Vref. By doing so, accurate correction can be performed with respect to the temperature characteristics or variations over time due to aging or the like of the first reference voltage Vref1 or the second reference voltage Vref2.

Furthermore, as described above, the first reference voltage Vref1 preferably takes a value equivalent to the pixel signal Vcds in the dark state. When the same voltage value is used for the first reference voltage Vref1 and the second reference voltage Vref2, it is preferable that a value equivalent to the pixel signal Vcds is used for the second reference voltage Vref2, 1.6 Advantageous Effects As described above, with the scanner unit 3 according to the first embodiment, each of the plurality of image reader chips 415 includes a capacitive element 151 selectively connected by the correction signal CAL. During the period in which the correction signal CAL is active (high level), electric charges including an offset component are stored in the capacitive element 151 of the correction circuit 150 based on the first reference voltage Vref1 and the second reference voltage Vref2 that are supplied commonly to the plurality of image reader chips 415, and during the period in which the correction signal CAL is inactive (low level), the corrected image signal Vo is output based on the electric charges stored in the capacitive element 151. It is thereby possible to suppress variations in characteristics between the plurality of image reader chips 415, and suppress image quality degradation.

2. Second Embodiment

Hereinafter, a multifunction peripheral 1 (multifunction peripheral apparatus) to which an image reader device according to a second embodiment is applied will be described mainly focusing on differences from the first embodiment by giving the same reference numerals to the constituent elements that are the same as those of the first embodiment and omitting an overlapping description with the first embodiment.

A structure of the multifunction peripheral 1 to which the image reader device according to the second embodiment is applied is the same as that of the first embodiment (FIGS. 1 to 4), and thus an illustration and a description thereof are omitted here. Also, a functional configuration diagram (FIG. 5) of a scanner unit 3 according to the second embodiment is the same as that of the first embodiment, and thus an illustration and a description thereof are omitted here. Also, a functional configuration diagram (FIG. 6) of an image reader chip 415 according to the second embodiment is the same as that of the first embodiment, and thus an illustration and a description thereof are omitted here. Also, a timing chart diagram (FIG. 7) according to the second embodiment is the same as that of the first embodiment, and thus an illustration and a description thereof are omitted here. Also, a configuration diagram (FIG. 8) of a pixel circuit 110 according to the second embodiment is the same as that of the first embodiment, and thus an illustration and a description thereof are omitted here. Also, a configuration (FIG. 9) of a readout circuit 120 according to the second embodiment is the same as that of the first embodiment, and thus an illustration and a description thereof are omitted here. Also, a circuit configuration (FIG. 10) of a constant voltage output circuit 170 and an output circuit 140 according to the second embodiment is the same as that of the first embodiment, and thus a description thereof is omitted here. However, a circuit configuration diagram (FIG. 10) of a correction circuit 150 according to the second embodiment is different from that of the first embodiment.

Figure 11:
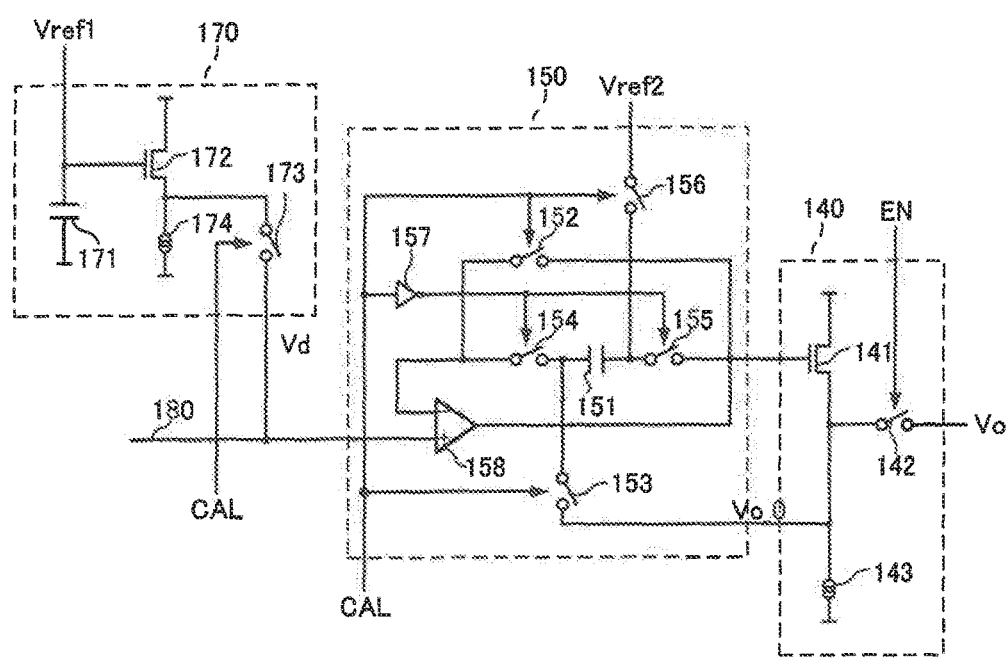
FIG. 11 is a diagram showing a circuit configuration of a constant voltage output portion, a correction circuit, and an output circuit according to a second embodiment.

FIG. 11 is a circuit configuration diagram of an output circuit 140, a correction circuit 150, and a constant voltage output circuit 170 included in an image reader chip 415 according to the second embodiment. The circuit configuration of the output circuit 140 and the constant voltage output circuit 170 is the same as that of the first embodiment (FIG. 10), and thus a description thereof is omitted here.

The correction circuit 150 according to the second embodiment includes, as in the first embodiment, a capacitive element 151, and fives switches including a switch 152, a switch 153, a switch 154, a switch 155, and a switch 156.

As in the first embodiment, the capacitive element 151 has a first terminal that is electrically connected to one end of the switch 153 and one end of the switch 154, and a second terminal that is electrically connected to one end of the switch 155 and one end of the switch 156.

The five switches including the switch 152, the switch 153, the switch 154, the switch 155, and the switch 156 are each controlled between an electrically connected state and an electrically disconnected state by the correction signal CAL (or the logical inverse signal of the correction signal CAL) input into the control terminal in the same manner as in the first embodiment including the control timing, and thus a description thereof is omitted here.

The correction circuit 150 according to the second embodiment further includes, in addition to the correction circuit 150 according to the first embodiment, an operational amplifier 158 provided in a transfer interconnect 180. The operational amplifier 158 includes a first input terminal that is electrically connected to the transfer interconnect 180, a second input terminal that is electrically connected to the other end of the switch 152 and the other end of the switch 154, and an output terminal that is electrically connected to the output circuit 140. Here, the first input terminal of the operational amplifier 158 may be a non-inverting input terminal, and the second input terminal may be an inverting input terminal At this time, the operational amplifier 158 performs operation as a voltage follower.

During the period in which the correction signal CAL is active (high level), as in the first embodiment, the switch 152, the switch 153, and the switch 156 are electrically connected, and the switch 154 and the switch 155 are electrically disconnected. Accordingly, the dummy voltage Vd from the transfer interconnect 180 is input into the first input terminal of the operational amplifier 158, and an identical voltage is generated at the second input terminal of the operational amplifier 158 (virtual short). The voltage generated at the second input terminal of the operational amplifier 158 is connected to the first terminal of the capacitive element 151 via the switch 152, the output circuit 140, and the switch 153, and electric charges are stored in the capacitive element 151. At this time, as in the first embodiment, the second terminal of the capacitive element 151 is connected to the second reference voltage Vref2 via the switch 156. Details thereof are the same as those of the first embodiment, and thus a description thereof is omitted here.

During the period in which the correction signal CAL is inactive (low level), as in the first embodiment, the switch 154 and the switch 155 are electrically connected, and the switch 152, the switch 153, and the switch 156 are electrically disconnected. At this time, the pixel signal Vt from the transfer interconnect 180 is input into the first input terminal of the operational amplifier 158, and an identical voltage is generated at the second input terminal The voltage generated at the second input terminal is output to the output circuit 140 via the switch 154, the capacitive element 151, and the switch 155. The output circuit 140 outputs the input signal as an image signal Vo via the NMOS transistor 141. At this time, as in the first embodiment, electric charges are stored in the capacitive element 151 during the period in which the correction signal CAL is active (high level), and the image signal Vo is corrected by using the stored electric charges. That is, the operational amplifier 158 having the first input terminal that is connected to the transfer interconnect 180 and the output terminal that is connected to the output circuit 140, the capacitor having the first terminal that is selectively connected to the second input terminal of the operational amplifier 158 and the second terminal that is selectively connected to the output circuit 140, and the constant voltage output portion that outputs a constant voltage signal are included, and the constant voltage output portion is selectively connected to the first terminal of the capacitor via the output circuit 140.

In the first embodiment, although not shown in the diagram, the NMOS transistor 141 provided in the output circuit 140 has a slight parasitic capacitance such as a gate capacitance, and in the first embodiment, the gate voltage of the NMOS transistor 141 varies a little between the period in which the correction signal CAL is active (high level) and the period in which the correction signal CAL is inactive (low level). This is because when the correction signal CAL is changed from the active state (high level) to the inactive state (low level), electric charges migrate between the capacitive element 151 and a parasitic capacitance Cp of the NMOS transistor 141. Here, where the correction component of the image signal Vo is represented by $\Delta V$, the capacitance of the capacitive element 151 is represented by Ccal, and the parasitic capacitance of the NMOS transistor 141 is represented by Cp, the correction voltage at the gate terminal of the NMOS transistor 141 is expressed by $\Delta V - Cp/(Cp+Ccal) \times \Delta V$, and variations occur by an amount corresponding to $Cp/(Cp+Ccal) \times \Delta V$, causing image quality degradation. In the dark state, in particular, the signal component is very small, and thus even a slight noise component exerts a significant influence on image quality degradation.

However, according to the second embodiment, the operational amplifier 158 has negative feedback applied thereto, and thus the voltage at the first input terminal and the voltage at the second input terminal of the operational amplifier 158 are equal (virtual short). Also, as described above, if the first reference voltage Vref1 and the second reference voltage Vref2 have the same level as the pixel signal Vt in the dark state, irrespective of whether the period in which the correction signal CAL is active (high level) or the period in which the correction signal CAL is inactive (low level), the voltage at the second input terminal of the operational amplifier 158 in the dark state is equal. Accordingly, the influence of parasitic capacitance of the NMOS transistor 141 can be minimized.

The second embodiment described above produces the same effects as those of the first embodiment. Furthermore, because the operational amplifier 158 is provided, it is possible to reduce the influence of parasitic capacitance of the NMOS transistor 141 provided in the output circuit 140 and further improve the quality of read images.

Although the first embodiment and the second embodiment have been described above, the invention is not limited to these embodiments, and can be carried out in various types of aspects within the scope of the gist of the invention. For example, it is also possible to combine the embodiments given above as appropriate.

The invention encompasses a configuration that is substantially the same as those described in the embodiments (for example, a configuration having the same functions, methods and results, or a configuration having the same object and effects). Also, the invention encompasses a configuration obtained by changing a portion that is not essential to the configurations described in the embodiments above. Also, the invention encompasses a configuration that produces advantageous effects that are the same as those described in the embodiments above or a configuration that can achieve the same object. Also, the invention encompasses a configuration obtained by adding a known technique to the embodiments described above.

This application claims priority from Japanese Patent Application No. 2016-191497 filed in the Japanese Patent Office on Sep. 29, 2016, the entire disclosure of which is hereby incorporated by reference in its entirely.

What is claimed is:

1. An image reader device comprising
a plurality of image reader chips for reading an image, wherein each of the plurality of image reader chips includes:
a pixel portion that outputs a pixel signal, the pixel portion including a light receiving element that receives light from the image and performs photoelectric conversion;
a readout circuit that reads out the pixel signal output from the pixel portion;
an output circuit that receives the pixel signal from the readout circuit via a transfer interconnect and outputs the pixel signal;
a capacitor having a first terminal that is selectively connected to the transfer interconnect and a second terminal that is selectively connected to the output circuit; and
a constant voltage output that outputs a constant voltage signal and is selectively connected to the first terminal of the capacitor via the output circuit.

2. The image reader device according to claim 1,
wherein when the pixel signal is reads out by the readout circuit and is transferred to the transfer interconnect, the first terminal of the capacitor is connected to the transfer interconnect, and the second terminal of the capacitor is connected to the output circuit.

3. An image reader device comprising
a plurality of image reader chips for reading an image, wherein each of the plurality of image reader chips includes:
a pixel portion that outputs a pixel signal, the pixel portion including a light receiving element that receives light from the image and performs photoelectric conversion;
a readout circuit that reads out the pixel signal output from the pixel portion;
a transfer interconnect that transfers the pixel signal read out by the readout circuit;
an output circuit that outputs the pixel signal;
an operational amplifier having a first input terminal that is connected to the transfer interconnect and an output terminal that is connected to the output circuit;
a capacitor having a first terminal that is selectively connected to a second input terminal of the operational amplifier and a second terminal that s selectively connected to the output circuit; and
a constant voltage output that outputs a constant voltage signal and is selectively connected to the first terminal of the capacitor via the output circuit.

4. The image reader device according to claim 3,
wherein when the pixel signal is transferred to the transfer interconnect, the first terminal of the capacitor is connected to the second input terminal of the operational amplifier, and the second terminal of the capacitor is connected to the output circuit.

5. The image reader device according to claim 1,
wherein the constant voltage output is connected to the first terminal of the capacitor via the output circuit before the pixel signal is transferred to the transfer interconnect.

6. The image reader device according to claim 1,
wherein the voltage signal output by the constant voltage output is generated based on a first reference voltage, and
the first reference voltage is a voltage that is common to the plurality of image reader chips.

7. The image reader device according to claim 1,
wherein the second terminal of the capacitor is selectively connected to a second reference voltage before the pixel signal is transferred to the transfer interconnect.

8. The image reader device according to claim 7,
wherein the second reference voltage is a voltage that is common to the plurality of image reader chips.

9. The image reader device according to claim 7,
wherein the first reference voltage and the second reference voltage are the same voltage.

10. The image reader device according to claim 1,
wherein the output circuit is a source follower circuit.

11. The image reader device according to claim 1,
wherein the readout circuit and the constant voltage output are source follower circuits.

12. The image reader device according to claim 10,
wherein the source follower circuit includes a depletion type field-effect transistor.

13. A semiconductor device comprising:
a pixel portion that outputs a pixel signal, the pixel portion including a light receiving element that receives light and performs photoelectric conversion;
a readout circuit that reads out the pixel signal output from the pixel portion;
an output circuit that receives the pixel signal from the readout circuit via a transfer interconnect and outputs the pixel signal;
a capacitor having a first terminal that is selectively connected to the transfer interconnect and a second terminal that is selectively connected to the output circuit; and a constant voltage output that outputs a constant voltage signal and is selectively connected to the first terminal of the capacitor via the output circuit.

\* \* \* \* \*